US010009493B2

(12) United States Patent
Kakuta (10) Patent No.: US 10,009,493 B2
(45) Date of Patent: Jun. 26, 2018

(54) DOCUMENT CONVEYING APPARATUS, DOCUMENT READING APPARATUS, AND IMAGE FORMING APPARATUS

(71) Applicant: KYOCERA Document Solutions Inc., Osaka (JP)

(72) Inventor: Masayuki Kakuta, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days. days.

(21) Appl. No.: 15/331,314

(22) Filed: Oct. 21, 2016

(65) Prior Publication Data
US 2017/0149988 A1    May 25, 2017

(30) Foreign Application Priority Data
Nov. 19, 2015 (JP) ................... 2015-226714

(51) Int. Cl.
*G06K 15/00* (2006.01)
*H04N 1/00* (2006.01)
*G06F 3/12* (2006.01)

(52) U.S. Cl.
CPC ..... *H04N 1/00572* (2013.01); *H04N 1/00591* (2013.01); *H04N 1/00612* (2013.01); *H04N 1/00623* (2013.01); *H04N 1/00795* (2013.01); *H04N 2201/0094* (2013.01)

(58) Field of Classification Search
None
See application file for complete search history.

(56) References Cited

U.S. PATENT DOCUMENTS 4,761,001 A  *  8/1988  Hayakawa ......... G03B 27/6264
271/186

FOREIGN PATENT DOCUMENTS

JP      2005-239361 A     9/2005
JP      2009-203062 A     9/2009

* cited by examiner

*Primary Examiner* — Dov Popovici
(74) *Attorney, Agent, or Firm* — Studebaker & Brackett PC

(57) ABSTRACT

A document conveying apparatus includes a document reversing part, a stacking tray stacking the document, a discharge tray provided under the stacking tray, a lift member provided downstream in a document conveyance direction of the stacking tray and configured to be turnable upward such that a downstream end of the document stacked on the stacking tray comes into contact with a feed roller disposed above the stacking tray, a first document conveyance path defined downstream in the document conveyance direction of the feed roller to the document reading part, a second document conveyance path defined from the document reading part to the discharge tray, and a third document conveyance path defined from a middle of the second document conveyance path through the document reversing part, wherein a bottom surface part of the lift member defines a part of an upper part of the third document conveyance path.

9 Claims, 8 Drawing Sheets

DOCUMENT CONVEYING APPARATUS, DOCUMENT READING APPARATUS, AND IMAGE FORMING APPARATUS

INCORPORATION BY REFERENCE

This application is based on and claims the benefit of priority from Japanese patent application No. 2015-226714 filed on Nov. 19, 2015, which is incorporated by reference in its entirety.

BACKGROUND

The present disclosure relates to a document conveying apparatus, a document reading apparatus, and an image forming apparatus.

Hitherto, there is known an image forming apparatus including a document conveying apparatus configured to automatically convey a document stacked on a stacking tray one by one to an image reading position and to discharge the document after reading its image.

SUMMARY

According to one aspect of the present disclosure, a document conveying apparatus includes a document reversing part, a stacking tray, a discharge tray, a lift member, a first document conveyance path, a second document conveyance path, and a third document conveyance path. The document reversing part is configured to switch back a document whose image data has been read by a document reading part to change a conveyance direction of the document. The lift member is provided downstream in a document conveyance direction of the stacking tray and is configured to be turnable upward such that a downstream end of the document stacked on the stacking tray comes into contact with a feed roller disposed above the stacking tray. The first document conveyance path is defined downstream in the document conveyance direction of the feed roller to the document reading part. The second document conveyance path is defined from the document reading part to the discharge tray. The third document conveyance path is defined from a middle of the second document conveyance path through the document reversing part. A bottom surface of the lift member defines apart of an upper part of the third document conveyance path.

According to another aspect of the present disclosure, a document reading apparatus includes the document conveying apparatus and the document reading part configured to read image data from a document.

According to still other aspect of the present disclosure, an image forming apparatus includes the document conveying apparatus.

Further purposes, features and advantages of the present disclosure will become apparent from the following detailed description of exemplary suitable embodiments of the present disclosure with reference to the attached drawings.

DETAILED DESCRIPTION

An embodiment of the present disclosure will be described in detail with reference to the drawings. It is noted that in the following description, right and left directions will be based on directions seen from a front side of each drawing (directions seen in each drawing).

Figure 1:
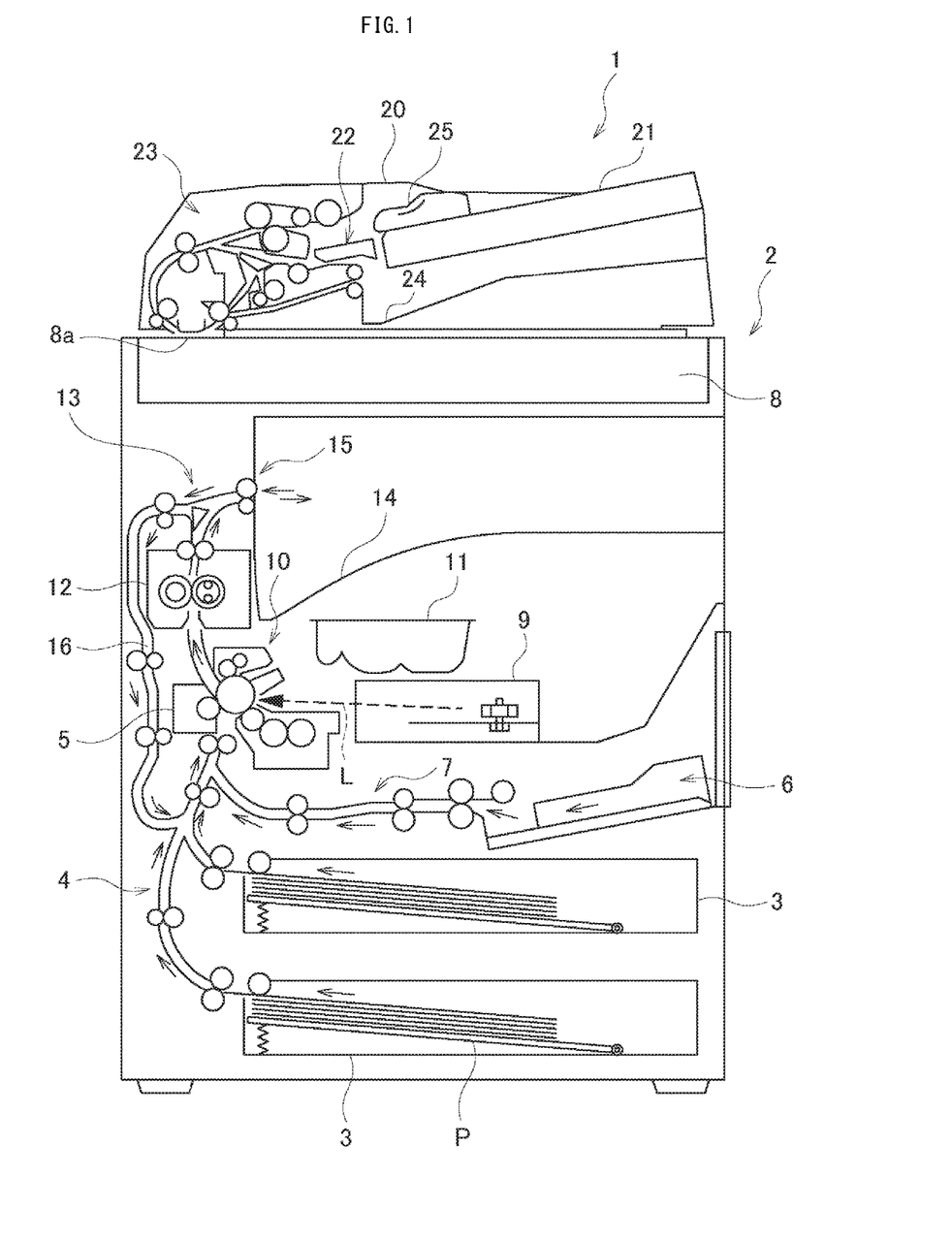
FIG. 1 is a front section view schematically illustrating a multi-function printer according to an embodiment of the present disclosure.

A multi-function printer 1 (one exemplary image forming apparatus) including a document conveying unit 20 of an embodiment of the present disclosure will be described briefly with reference to FIG. 1. Here, FIG. 1 is a front section view schematically illustrating the multi-function printer 1. In FIG. 1, solid-line arrows indicate conveyance directions of a sheet of paper and an arrow of a chain dot line indicates a direction of a laser beam. It is noted that the document conveying apparatus 20 is also one example of a document reading apparatus.

The multi-function printer 1 includes an apparatus body 2 and a sheet feed cassette 3 provided in a lower part of the apparatus body 2 so as to be horizontally drawn in/out from a front side of the apparatus body 2. The sheet feed cassette 3 is configured to stack and store the sheet of paper P to be printed. The sheet P is separated one by one and is delivered toward an upper left side of the sheet feed cassette 3.

A first sheet conveyance part 4 is defined approximately vertically along a left surface of the apparatus body 2 on a left side of the sheet feed cassette 3 within the apparatus body 2. The sheet P delivered out of the sheet feed cassette 3 is conveyed vertically upward along the left side surface of the apparatus body 2 by the first sheet conveyance part 4 and is conveyed to a transfer part 5.

A manual sheet feed part 6 is provided above the sheet feed cassette 3 and along aright side surface of the apparatus body 2. A sheet of paper P of a size that cannot be stored in the sheet feed cassette 3, a thick sheet, an OHP sheet, or the like is stacked on the manual sheet feed part 6.

A second sheet conveyance part 7 is defined on the left side of the manual sheet feed part 6. The second sheet conveyance part 7 extends approximately horizontally from the manual sheet feed part 6 to the first sheet conveyance part 4 above the sheet feed cassette 3 and merges with the first sheet conveyance part 4. The sheet P or the like delivered out of the manual sheet feed part 6 is conveyed to the first sheet conveyance part 4 by the second sheet conveyance part 7.

The document conveying apparatus 20 is mounted on an upper surface of the apparatus body 2, and an image reading unit 8 is provided under the document conveying apparatus 20. The document conveying apparatus 20 is attached so as to be able to open/close a contact glass 8a provided on an upper surface of the image reading unit 8. When a document is placed on the document conveying apparatus 20 and a predetermined operation is carried out from an operation panel not illustrated, the document is separated one by one and is delivered by the document conveying apparatus 20, and the image reading unit 8 reads image data of the document. It is noted that detailed configurations and operations of the document conveying apparatus 20 will be described later.

The document image data is sent to an exposure unit 9 disposed above the second sheet conveyance part 7 and at a center part of the apparatus body 2. The exposure unit 9 irradiates an image forming part 10 with a laser beam L controlled based on the image data.

The transfer part 5 and the image forming part 10 are provided above the first sheet conveyance part 4 and on the left side of the exposure unit 9 in FIG. 1. An electrostatic latent image is formed on the image forming part 10 by the laser beam L irradiated by the exposure unit 9, and a toner image is developed from the electrostatic latent image. Toner is replenished to the image forming part 10 from a toner container 11 provided above the exposure unit 9. The toner image formed in the image forming part 10 is transferred by the transfer part 5 onto the sheet P sent through the first sheet conveyance part 4.

A fixing unit 12 is provided above the transfer part 5. The sheet P bearing the non-fixed toner image in the transfer part 5 is sent to the fixing unit 12 to fix the toner image.

A sheet guide unit 13 is provided above the fixing unit 12. In a case when no duplex printing is carried out on the sheet P discharged out of the fixing unit 12, the sheet P is discharged from the sheet guide unit 13 to an in-body sheet discharge part 14 provided within the body of the multifunction printer 1.

A discharge port through which the sheet P is discharged from the sheet guide unit 13 to the in-body sheet discharge part 14 functions also as a switchback part 15, and a conveyance direction of the sheet P discharged out of the fixing unit 12 is changed at this switchback part 15 in carrying the duplex printing. Then, the sheet P passes through the sheet guide unit 13, is sent downward through a duplex printing sheet conveyance path 16 provided on the left side of the fixing unit 12 and the transfer part 5, and is sent to the transfer part 5 again through the first sheet conveyance part 4. After that, the sheet P undergoes the similar operation as described above and is discharged to the in-body sheet discharge part 14.

Figure 2:
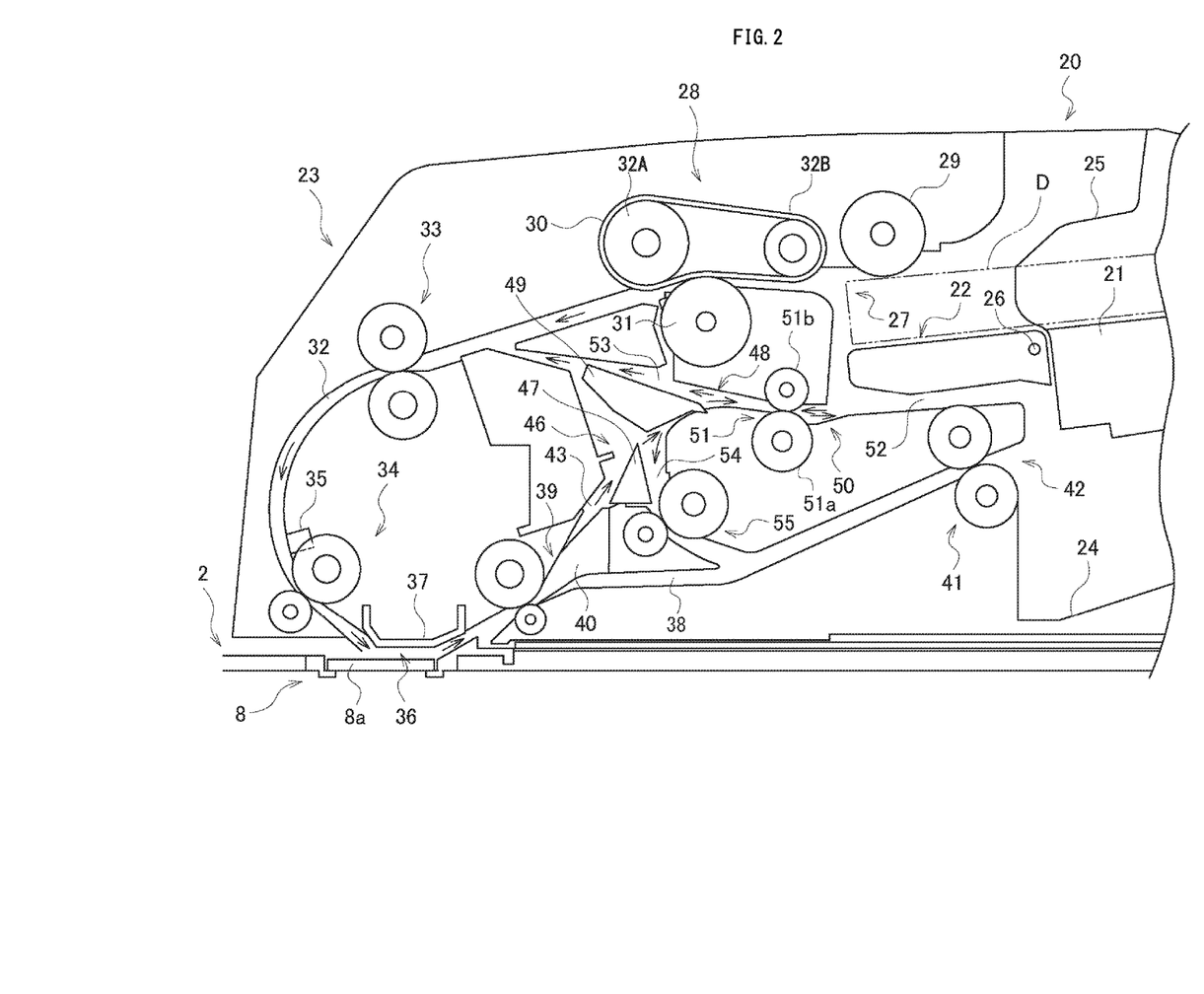
FIG. 2 is a front section view schematically illustrating a document conveying apparatus of the embodiment of the present disclosure.

Next, the document conveying apparatus 20 of the present embodiment of the present disclosure will be described in detail with reference to FIG. 2. Here, FIG. 2 is a front section view schematically illustrating the document conveying apparatus 20. In FIG. 2, solid-line arrows indicate conveyance directions of a document.

The document conveying apparatus 20 includes, in order from upstream in the conveyance direction of the document D (indicated by two-dot chain line), a stacking tray 21, a lift member 22, a document feed part 23, and a discharge tray 24.

The stacking tray 21 is provided at an upper right part of the document conveying apparatus 20 and is formed to be able to stack the document D from above. The stacking tray 21 is formed so as to decline from upstream to downstream in the document conveyance direction, i.e., from right to left in FIG. 2. The stacking tray 21 is also provided with a cursor 25 to regulate a height of documents to a predetermined height when the documents are to be fully loaded.

The lift member 22 is provided downstream in the document conveyance direction of the stacking tray 21. The lift member 22 is formed into a shape along a stacking surface of the stacking tray 21 and is rotatable in a vertical direction centering on a support shaft 26 provided at an end part (right part in FIG. 2) of the stacking tray 21. It is noted that the lift member 22 will be detailed later.

The document feed part 23 includes a document supply port 27 and a document supply unit 28. The document supply unit 28 includes a pickup roller 29 disposed above the lift member 22 upstream in the document conveyance direction of the document supply port 27, a supply belt 30 disposed downstream in the document conveyance direction of the document supply port 27, and a separation roller 31.

The supply belt 30 is wrapped around two pulleys 32A, 32B and rotates in the document conveyance direction. The separation roller 31 is disposed under the supply belt 30 and is in contact with the supply belt 30. The document D is inserted through a conveying nip defined between the supply belt 30 and the separation roller 31 in contact with each other.

A first document conveyance path 32 is defined downstream in the document conveyance direction of the document supply port 27. In FIG. 2, the first document conveyance path 32 extends to a lower left side and then curves to a lower right side. The first document conveyance path 32 is provided with a conveyance roller pair 33 and a registration roller pair 34 downstream in the document conveyance direction of the document supply unit 28. A timing switch 35 is also provided right upstream in the conveyance direction of the registration roller pair 34. The timing switch 35 detects passage of a rear end of the document D. Information on the passage time of the document D obtained by the timing switch 35 is used as a basis of operation timing and operation times of conveyance rollers and a driving part provided in the document feed part 23.

A downstream end in the document conveyance direction of the first document conveyance path 32 reaches a bottom surface of the document conveying apparatus 20 where the document reading part 36 is disposed. The document reading part 36 is provided with a reading guide member 37.

The reading guide member 37 is disposed so as to face the contact glass 8a of the image reading unit 8. The reading guide member 37 extends widely in a front-rear direction of the document conveying apparatus 20 (in a direction vertical to the sheet surface of FIG. 2) and is formed such that a part guiding the document D is bumped downward. Then, in a condition of FIG. 2 in which the document conveying apparatus 20 closes the image reading unit 8, the reading guide member 37 guides the document D passing through a part between the contact glass 8a and the reading guide member 37 so as to come into contact with the contact glass 8a.

A second document conveyance path 38 that extends on the right side in FIG. 2 is defined downstream in the document conveyance direction of the first document conveyance path 32. The second document conveyance path 38 is provided with a document switching part 39 downstream in the document conveyance direction of the document reading part 36.

The document switching part 39 is provided with a switching guide 40 swingable centering on a supporting shaft not illustrated and extending approximately horizontally in the front-rear direction (in the direction vertical to the sheet surface of FIG. 2). The switching guide 40 is formed into a shape of a wedge and its posture is changed such that an upstream front edge in the document conveyance direction is swung up and down by a solenoid not illustrated.

A discharge roller pair 41 and a discharge port 42 are provided downstream in the document conveyance direction of the second document conveyance path 38. The discharge tray 24 is provided under the stacking tray 21, and the stacking tray 21 and the discharge tray 24 are formed in two stages of upper and lower stages.

Still further, defined downstream in the conveyance direction of the document switching part 39 is a third document conveyance path 43 that extends obliquely upper right with respect to the second document conveyance path 38 that extends to the right side. The third document conveyance path 43 is provided with a first document branching part 46 downstream in the conveyance direction of the document switching part 39, and the first document branching part 46 is provided with a first branch guide 47. The first branch guide 47 is formed into a shape of a wedge in section that extends in the front-rear direction of the document conveying apparatus 20 (in the direction vertical to the sheet surface of FIG. 2) and is swingable centering on a support part not illustrated provided at a lower part thereof. The first branch guide 47 changes its posture so as to swing its upper end to the right side in FIG. 2 when the document D passes through the third document conveyance path 43. When the document D finishes to pass through the first branch guide 47 or the document D is not in contact with the first branch guide 47, the first branch guide 47 swings its upper end to the left side in FIG. 2 and keeps its posture as illustrated in FIG. 2.

The third document conveyance path 43 is provided with a second document branching part 48 at a downstream end in the document conveyance direction of the first document branching part 46, and the second document branching part 48 is provided with a second branch guide 49. The second branch guide 49 is formed into a shape of a wedge in section so as to extend in the front-rear direction of the document conveying apparatus 20 (in the direction vertical to the sheet surface of FIG. 2), includes a support shaft not illustrated at a left part of the second branch guide 49 and is swingable centering on the support shaft. The second branch guide 49 changes its posture so that a right end thereof in FIG. 2 swings upward when the document D passes through the third document conveyance path 43 and keeps its posture as illustrated in FIG. 2 by swinging its right end in FIG. 2 downward when the document D finishes to pass through the second branch guide 49 or when the document D is not in contact with the second branch guide 49.

The third document conveyance path 43 is also provided with a document reversing part 50 downstream in the document conveyance direction of the second document branching part 48. The document reversing part 50 includes a reversing roller pair 51 composed of a reversing roller 51*a* and a driven roller 51*b* which are in contact with each other and form a conveyance nip conveying the document D. The reversing roller pair 51 also includes a reversing path 52 defined on the right side of the reversing roller pair 51 (downstream end of the third document conveyance path 43). The reversing roller 51*a* is enabled to rotate clockwise and counterclockwise in FIG. 2 by a motor not illustrated.

Provided on the left side of the document reversing part 50 and the second document branching part 48 and above the third document conveyance path 43 is a fourth document conveyance path 53. The fourth document conveyance path 53 extends toward the left side from the document reversing part 50 and the second document branching part 48 and merges with the first document conveyance path 32 upstream in the conveyance direction of the conveyance roller pair 33.

Still further, a fifth document conveyance path 54 is provided so as to branch from the middle of the third document conveyance path 43 in the first document branching part 46. The fifth document conveyance path 54 extends to a lower right side from the first document branching part 46 and merges with the second document conveyance path 38. A conveyance roller pair 55 is provided on the middle of the fifth document conveyance path 54.

Figure 3:
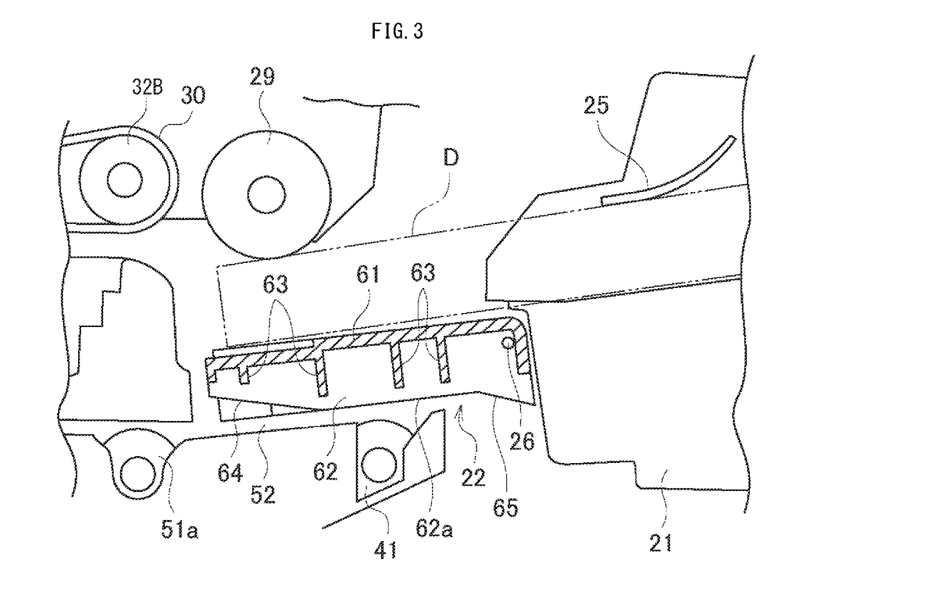
FIG. 3 is a front section view illustrating a lift member and peripheral members of the lift member of the document conveying apparatus of the embodiment of the present disclosure.
Figure 4:
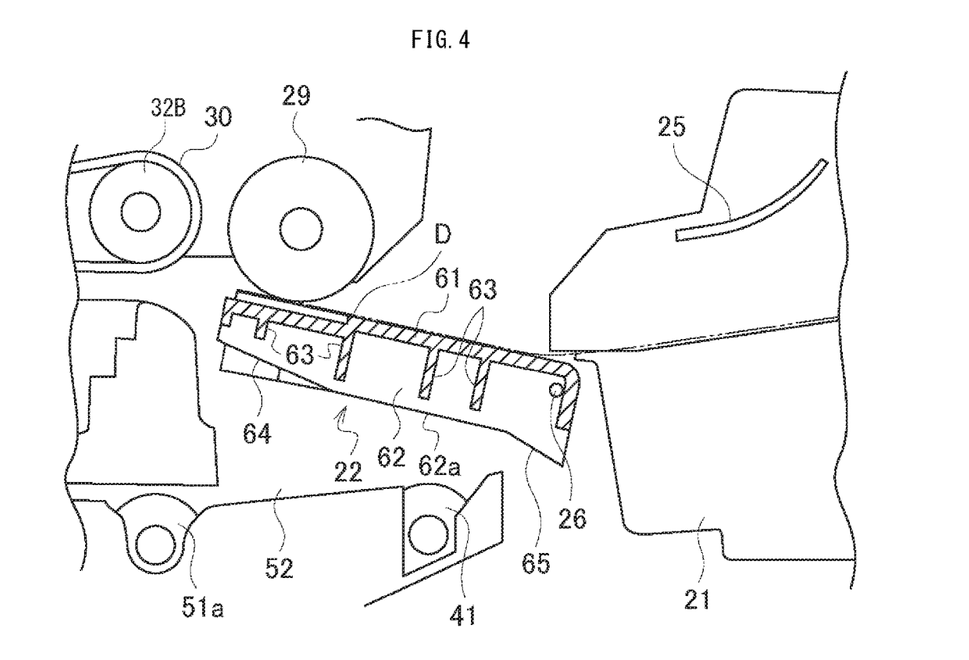
FIG. 4 is a front section view illustrating the lift member and the peripheral members of the lift member of the document conveying apparatus of the embodiment of the present disclosure.
Figure 5:
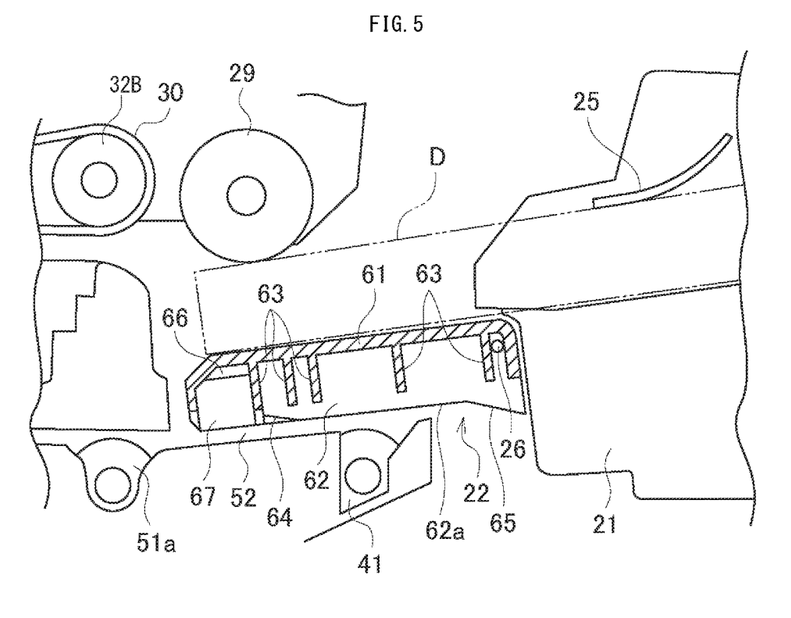
FIG. 5 is a front section view illustrating the lift member and the peripheral members of the lift member of the document conveying apparatus of the embodiment of the present disclosure.
Figure 6:
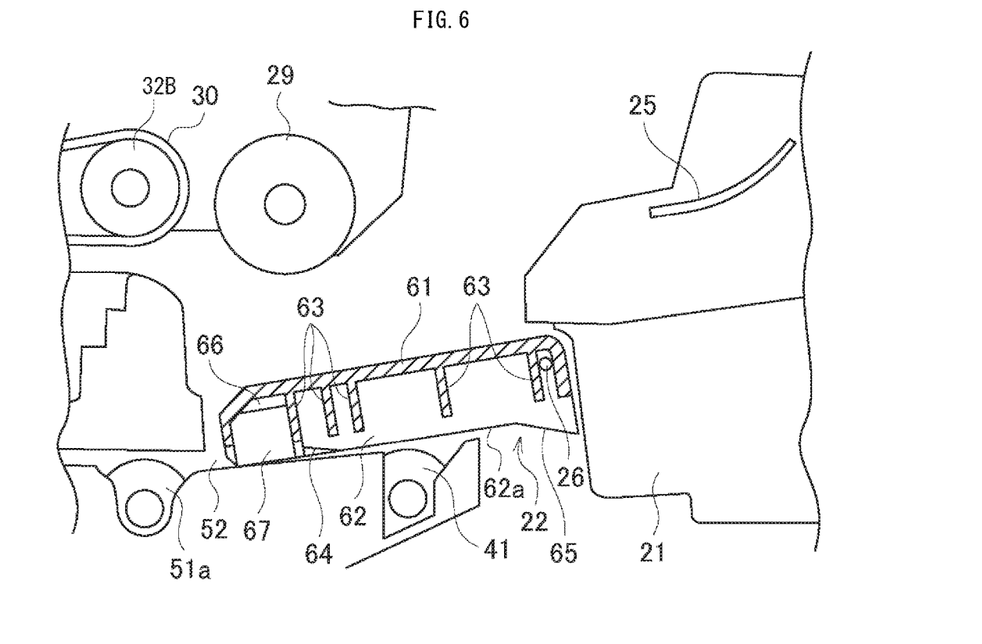
FIG. 6 is a front section view illustrating the lift member and the peripheral members of the lift member of the document conveying apparatus of the embodiment of the present disclosure.

Next, the lift member 22 will be described with reference to FIGS. 3 through 6. Here, FIGS. 3 through 6 are section views illustrating the lift member 22 and peripheral members thereof. FIGS. 3 and 4 are front section views of the lift member 22 located at a position deviated forward from a center part in the front-rear direction thereof, and FIGS. 5 and 6 are front section views of the lift member 22 located at the center part in the front-rear direction thereof.

The lift member 22 includes a plate-like upper surface 61 extending in the front-rear direction (direction vertical to the sheet surface of FIG. 3), a plurality of ribs 62 extending downward from an under surface of the upper surface 61 so as to be in parallel in the front-rear direction, and a plurality of reinforcing parts 63 formed so as to connect the ribs 62 adjacent with each other in the front-rear direction.

A bottom surface 62*a* of each rib 62 is formed so as to define an upper part of the reversing path 52 of the third document conveyance path 43. A first inclination 64 is formed at a front end (left end in FIG. 3) of each rib 62. The first inclination 64 is formed so as to incline upward from the bottom surface 62*a* to the front end. A second inclination 65 is provided at a base end (right end in FIG. 3) of each rib 62. The second inclination 65 is formed so as to decline from the bottom surface 62*a* to the base end.

Positions, shapes and numbers of the respective reinforcing parts 63 are different at the center part in the front-rear direction and at positions deviated from the center part. As illustrated in FIGS. 5 and 6, a document detecting sensor 67 is held in a space 66 surrounded by the reinforcing part 63 and the rib 62 at the front end of the center part. The document detecting sensor 67 can detect whether or not a document is present on the lift member 22.

Next, a document conveyance operation of the document conveying apparatus 20 of the embodiment of the present disclosure will be described with reference to FIGS. 2 through 6.

When a user places a document D on the stacking tray 21 and carries out predetermined operations from the operation panel not illustrated, the document D stacked on the stacking tray 21 is lifted by the lift member 22 and a downstream end of the uppermost document D comes into contact with the pickup roller 29 from underneath. The uppermost document D is delivered from the pickup roller 29 to the supply belt 30 and is conveyed into the document feed part 23 by the supply belt 30.

While FIGS. 3 and 5 illustrate conditions in which the documents D are fully loaded on the stacking tray 21 and FIG. 4 illustrates a condition in which a few document D is loaded on the stacking tray 21, the lift member 22 keeps the posture turning upward in either cases so as to open the reversing path 52 of the third document conveyance path 43 during when the document conveying apparatus 20 conveys the document D.

After that, the document D is conveyed to the document reading part 36 bypassing through the first document conveyance path 32, and the image data of an undersurface of the document D is read by the image reading unit 8 of the apparatus body 2 (see FIG. 1).

In a case of reading only image data of one surface, the document D whose image data has been read is apportioned to the second document conveyance path 38 by the switching guide 40 of the document switching part 39 and is discharged by the discharge roller pair 41 to the discharge tray 24 from the discharge port 42.

Meanwhile, in a case of reading image data of both front and back surfaces, the document D is apportioned to the third document conveyance path 43 from the middle of the second document conveyance path 38 by the switching guide 40 of the document switching part 39. The document D that has entered the third document conveyance path 43 is sent to the document reversing part 50 through the first document branching part 46 and the second document branching part 48.

The document reversing part 50 sends a downstream part of the document D conveyed to the third document conveyance path 43 once to the reversing path 52 on a rear side (the right side in FIG. 2), and when an upstream part in the conveyance direction of the document D approaches the reversing roller pair 51, the rotation of the reversing roller 51a is reversed in a condition in which the document D is held in the conveyance nip of the reversing roller 51a and the driven roller 51b to switch back the document D and to change the conveyance direction from the right to the left.

Thereby, the document D which has passed through the second document branching part 48 and whose conveyance direction has been changed by the document reversing part 50 is sent again to the first document conveyance path 32 bypassing through the fourth document conveyance path 53, and the image data of the surface opposite to the surface which has been read is read by the document reading part 36.

The document D whose image data of the both surfaces have been thus read enters again the third document conveyance path 43 from the middle of the second document conveyance path 38 and is conveyed toward the document reversing part 50. After that, the document D is switched back at the document reversing part 50 and enters from the third document conveyance path 43 to the fifth document conveyance path 54 by the first document branching part 46. Then, the document D passes through the second document conveyance path 38 and is discharged by the discharge roller pair 41 to the discharge tray 24 through the discharge port 42.

The same operations are repeated thereafter until when no document is left on the stacking tray 21. When the document conveyance operation of the document conveying apparatus 20 is completed, the lift member 22 turns downward and the front end of the lift member 22 closes the reversing path 52 of the third document conveyance path 43 as illustrated in FIG. 6.

According to the embodiment of the present disclosure described above, the lift member 22 defines the upper part of the reversing path 52 of the third document conveyance path 43. Therefore, this arrangement makes it possible to suppress sizes in a height direction of the document conveying apparatus 20 and the multi-function printer 1, enabling to compact and to lighten the document conveying apparatus 20 and the multi-function printer 1. Along with that, no part other than the lift member 22 is required to define the reversing path 52, so that this arrangement also makes it possible to cut component costs and assembling man-hours. It is noted that the third document conveyance path 43 is connected with the middle of the first document conveyance path 32. Therefore, the document D which has switched back in the third document conveyance path 43 is sent to the first document conveyance path 32.

Still further, the lift member 22 is provided so as to be turnable in the vertical direction centering on the side end of the stacking tray 21, to turn upward such that the front end of the lift member 22 opens the third document conveyance path 43 in conveying a document, and to turn downward such that the front end of the lift member 22 closes the third document conveyance path 43 in conveying no document. Therefore, this arrangement makes it possible to suppress the size in the height direction of the document conveying apparatus 20 and to compact and lighten the apparatus. Still further, this arrangement requires no component defining a part of the upper part of the third document conveyance path 43 besides the lift member 22, it is possible to cut the component costs and the assembling man-hours of the document conveying apparatus 20 and the multi-function printer 1.

Still further, the first inclination 64 is provided on the bottom surface at the front end of the lift member 22 so as to incline upward from the bottom surface 66a to the front end. This arrangement makes it possible to smoothly and reliably switch back the document in the document reversing part 50 and to increase reliability of the apparatus.

Still further, the second inclination 65 is provided on the bottom surface at the base end of the lift member 22 so as to decline from the bottom surface 66a to the base end. This arrangement makes it possible to smoothly and reliably switch back the document in the document reversing part 50 and to increase the reliability of the apparatus.

Still further, a concavity 71 is defined under the front end of the lift member 22. This arrangement makes it possible to suppress the height of the document conveying apparatus 20 further. Along with that, the document conveying apparatus 20 can be compacted and lightened further.

Still further, an elastic part 72 is formed under the front end of the lift member 22. This arrangement makes it possible to suppress the height of the document conveying apparatus 20 further. Along with that, the document conveying apparatus 20 can be compacted and lightened further.

While the present disclosure has been described along with the specific embodiments, the present disclosure is not limited to the abovementioned embodiments. Persons skilled in the art may be able to modify the abovementioned embodiments in so far as not departing from the scope and gist of the present disclosure.

Figure 7:
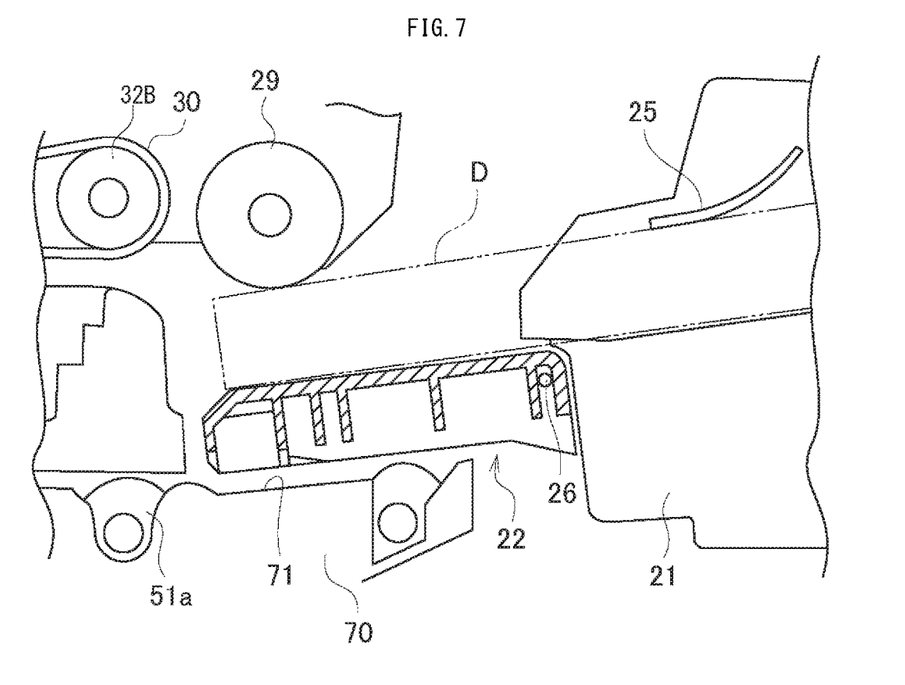
FIG. 7 is a front section view illustrating a modified example of the lift member and the peripheral members of the lift member of the document conveying apparatus of the embodiment of the present disclosure.
Figure 8:
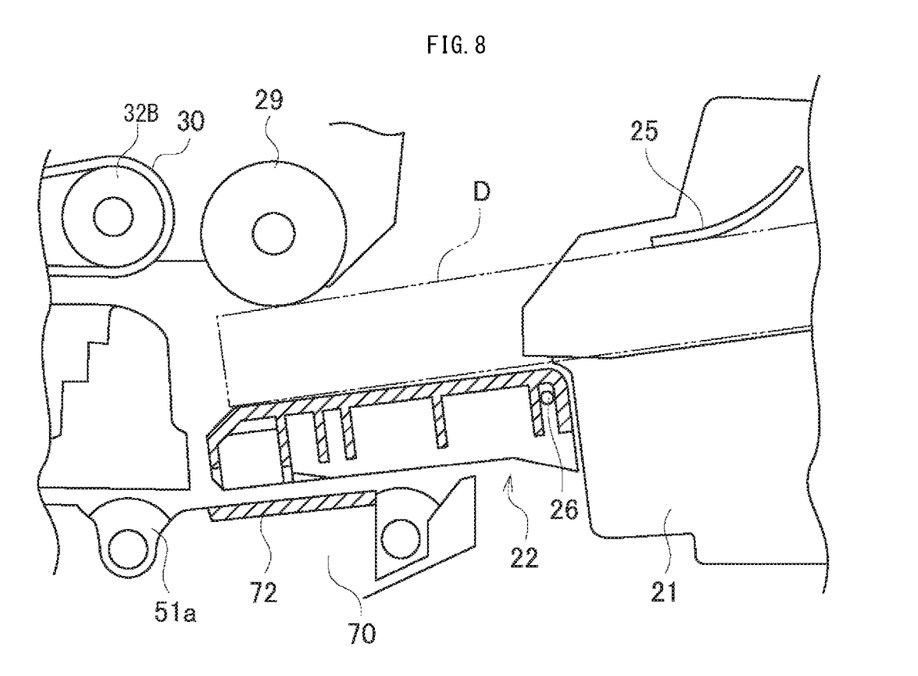
FIG. 8 is a front section view illustrating a still other modified example of the lift member and the peripheral members of the lift member of the document conveying apparatus of the embodiment of the present disclosure.

For instance, as illustrated in FIG. 7, it is possible to define the concavity 71 in the member 70 under the front end of the lift member 22, or the elastic part 72 may be formed in the member 70 under the front end of the lift member 22 as illustrated in FIG. 8. These arrangements make it possible to suppress the height of the document conveying apparatus 20 and the multi-function printer 1 further, so that it is possible to compact and lighten the document conveying apparatus 20 and the multi-function printer 1 further.

The invention claimed is:

1. A document conveying apparatus comprising:
   a document reversing part configured to switch back a document whose image data has been read by a document reading part to change a conveyance direction of the document;
   a stacking tray stacking the document;
   a discharge tray provided under the stacking tray;
   a lift member provided downstream in a document conveyance direction of the stacking tray and configured to be turnable upward such that a downstream end of the document stacked on the stacking tray comes into contact with a feed roller disposed above the stacking tray;
   a first document conveyance path defined downstream in the document conveyance direction of the feed roller to the document reading part;
   a second document conveyance path defined from the document reading part to the discharge tray; and
   a third document conveyance path defined from a middle of the second document conveyance path through the document reversing part,
   wherein the document reversing part includes a reversing roller pair and a reversing path defined at a downstream end of the reversing roller pair in a conveyance direction in the third document conveyance path, and
   wherein a bottom surface of the lift member defines a part of an upper wall of the reversing path included in the third document conveyance path.

2. The document conveying apparatus according to claim 1, wherein the lift member is turnable in a vertical direction centering on the stacking tray side end as a fulcrum, turns upward in conveying a document such that a front end of the lift member opens the third document conveyance path, and turns downward in conveying no document such that the front end of the lift member closes the third document conveyance path.

3. The document conveying apparatus according to claim 2, wherein a first inclination is provided on the bottom surface side of the front end of the lift member such that the first inclination inclines upward from the bottom surface of the lift member to the front side of the lift member.

4. The document conveying apparatus according to claim 2, wherein a second inclination is provided on the bottom surface side of a based end of the lift member such that the second inclination inclines downward from the bottom surface of the lift member to the base end side of the lift member.

5. The document conveying apparatus according to claim 2, wherein a concavity is defined at a lower part of the front end of the lift member.

6. The document conveying apparatus according to claim 2, wherein an elastic part is defined in a lower part of the front end of the lift member.

7. The document conveying apparatus according to claim 1, wherein the third document conveyance path is connected to a middle of the first document conveyance path.

8. A document reading apparatus comprising:
   the document conveying apparatus as set forth in claim 1; and
   a document reading part configured to read image data from a document.

9. An image forming apparatus comprising the document conveying apparatus as set forth in claim 1.

* * * * *